US007002939B1

(12) United States Patent  
Hiramatsu

(10) Patent No.: US 7,002,939 B1
(45) Date of Patent: Feb. 21, 2006

(54) COMMUNICATION TERMINAL DEVICE AND CHANNEL ESTIMATING METHOD

(75) Inventor: Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 989 days.

(21) Appl. No.: 09/807,287

(22) PCT Filed: Aug. 23, 2000

(86) PCT No.: PCT/JP00/05622

§ 371 (c)(1),
(2), (4) Date: Apr. 11, 2001

(87) PCT Pub. No.: WO01/17130

PCT Pub. Date: Mar. 8, 2001

(51) Int. Cl.
H04B 7/216 (2006.01)
(52) U.S. Cl. ...................... 370/335; 370/342
(58) Field of Classification Search ............. None
See application file for complete search history.

(56) References Cited

U.S. PATENT DOCUMENTS

| 5,598,404 | A | * | 1/1997 | Hayashi et al. ............. 370/342 |
| 5,809,020 | A | * | 9/1998 | Bruckert et al. ............ 370/335 |
| 5,848,060 | A | * | 12/1998 | Dent ............................ 370/281 |
| 6,069,912 | A | * | 5/2000 | Sawahashi et al. ......... 375/142 |
| 6,081,549 | A | * | 6/2000 | Shou et al. .................. 375/152 |
| 6,201,843 | B1 | * | 3/2001 | Kingston et al. ........... 375/350 |
| 6,456,647 | B1 | * | 9/2002 | Banister ...................... 375/142 |

FOREIGN PATENT DOCUMENTS

| EP | 913971 | 5/1999 |
| JP | 56050641 | 5/1981 |
| JP | 58087928 | 5/1983 |
| JP | 1305729 | 12/1989 |
| JP | 4100327 | 4/1992 |
| JP | 10190537 | 7/1998 |
| JP | 11220778 | 8/1999 |
| JP | 2000151465 | 5/2000 |

OTHER PUBLICATIONS

"3rd Generation Patnership Project (3GPP); Technical Specification Group (TSG) Radio Access Network (RAN); Working Group 1 (WG1); Physical channels and mapping of transport channels onto physical channels (FDD)." TS 25.211 V2.1.1 Jul. 1999.

* cited by examiner

Primary Examiner—Huy D. Vu
Assistant Examiner—Cynthia L. Davis
(74) Attorney, Agent, or Firm—Stevens, Davis, Miller & Mosher, LLP

(57) ABSTRACT

A phase rotation amount estimating unit (210) rotates a channel estimation value of a signal in a common pilot channel (B) through a candidate phase rotation amount θ (θ=0, 180) for synthesizing with a channel estimation value of a signal in a common pilot channel (A). A phase rotation is estimated based on the highest one of orthogonalities between this synthesis result and channel estimation values of signals in individual channels. A channel estimation value synthesis unit (211) synthesizes a value obtained by rotating a channel estimation value of a signal in the common pilot channel (B) through a phase rotation amount θ with a channel estimation value of a signal in the common pilot channel (A), whereby the reliability of a channel estimation value can be enhanced in a transmission diversity-introduced radio communication system.

8 Claims, 10 Drawing Sheets

COMMUNICATION TERMINAL DEVICE AND CHANNEL ESTIMATING METHOD

TECHNICAL FIELD

The present invention relates to a CDMA-based communication terminal apparatus and channel estimation method used in a radio communication system such as automobile telephone and cellular telephone.

BACKGROUND ART

In a radio communication system, transmission diversity may be used on the base station side in order to increase reception power of transmission signals of individual channels (hereinafter referred to as "individual channel signals") on the communication terminal side by sending individual channel signals to one communication terminal from a plurality of diversity antennas.

FIG. 1 is a system configuration diagram of a system disclosed in the 3GPP WG1 TSG-RAN WG1 R1-99832 (Physical channels and mapping of transport channels onto physical channels (FDD)), as one example of a radio communication system using transmission diversity.

As shown in FIG. 1, base station 1 transmits common pilot channel transmission signal (hereinafter referred to as "common pilot channel signal") A from antenna A and transmits common pilot channel signal B from antenna B. At the same time, base station 1 transmits individual channel signal A to communication terminal 2 from antenna A and transmits individual channel signal B to communication terminal 2 from antenna B.

Since individual channel signal A and individual channel signal B are multiplied by a same spreading code at base station 1, communication terminal 2 receives individual channel signal A and individual channel signal B as one inseparable signal.

On the other hand, common pilot channel signal A and common pilot channel signal B are multiplied by different spreading codes. Or even if these two signals are multiplied by a same spreading code, these are made separable in some way. Therefore, communication terminal 2 can separate common pilot channel signal A from common pilot channel signal B. Moreover, individual channel signal A and common pilot channel signal A, and individual channel signal B and common pilot channel signal B are received through a same propagation path respectively, and therefore it is possible to know a phase rotation angle of individual channel signal B with respect to individual channel signal A by carrying out channel estimations of common pilot channel signal A and common pilot channel signal B.

FIG. 2 is a block diagram showing a configuration of a conventional communication terminal. In the communication terminal shown in FIG. 2, antenna 11 receives a signal transmitted from a base station and sends a signal to the base station. Duplexer 12 switches between time zones of transmission and reception. Reception RF section 13 amplifies the reception signal that passes duplexer 12 and converts the frequency of the reception signal to a baseband signal.

Despreading section 14 despreads the output signal of reception RF section 13 with a spreading code of an individual channel signal and extracts a modulated signal of an individual channel signal. Likewise, despreading section 15 despreads the output signal of reception RF section 13 with a spreading code of a common pilot channel signal A and extracts a modulated signal of common pilot channel signal A. Likewise, despreading section 16 despreads the output signal of reception RF section 13 with a spreading code of a common pilot channel signal B and extracts a modulated signal of common pilot channel signal B.

Channel estimation section 17 estimates (so-called "channel estimation") the phase and amplitude of a propagation path using pilot symbols in the modulated signal of the individual channel signal output from despreading section 14. In the following explanations, the phase and amplitude of an estimated propagation path will be referred to as a "channel estimation value".

Likewise, channel estimation section 18 performs a channel estimation using pilot symbols in the modulated signal of common pilot channel signal A output from despreading section 15 and channel estimation section 19 performs a channel estimation using pilot symbols in the modulated signal of common pilot channel signal B output from despreading section 16.

Demodulation section 20 demodulates the modulated signal of the individual channel signal output from despreading section 14 based on the channel estimation value output from channel estimation section 17.

Phase rotation control section 21 generates a phase rotation control signal that indicates the base station an amount of phase rotation based on a phase difference between common pilot channel signal A output from channel estimation section 18 and common pilot channel signal B output from channel estimation section 19.

Multiplexing section 22 multiplexes the transmission signal and the phase rotation control signal output from phase rotation control section 21. Modulation section 23 performs primary modulation processing such as QPSK on the output signal of multiplexing section 22. Spreading section 24 spreads the output signal of modulation section 23 by multiplying it by a specific spreading code. Transmission RF section 25 converts the frequency of the output signal of spreading section 24 to a radio frequency and transmits the signal by radio from antenna 11 via duplexer 12.

Then, a relationship between phase difference δ between individual channel signals and a channel estimation value estimated by channel estimation section 17 will be explained using FIG. 3A and FIG. 3B.

FIG. 3A shows channel estimation values when phase difference δ between individual channel signal A and individual channel signal B is $-90° \leq \delta \leq 90°$, while FIG. 3B shows channel estimation values when phase difference δ between individual channel signal A and individual channel signal B is $90° \leq \delta \leq 270°$.

In FIG. 3A and FIG. 3B, channel estimation value β (n) is expressed as a synthesized vector of channel estimation value βa(n) of individual channel signal A and channel estimation value βb(n) of individual channel signal B. Moreover, a channel estimation value resulting from a synthesis of −βb(n) obtained by rotating βb(n) by 180° and βa(n) is expressed as β'(n).

The longer the vectors of channel estimation values β(n) and β'(n), the greater the reception power of the communication terminal becomes and the reception quality improves.

As shown in FIG. 3A, when phase difference δ between individual channel signal A and individual channel signal B is $-90° \leq \delta \leq 90°$, β(n) is greater than β'(n).

On the other hand, as shown in FIG. 3B, when phase difference δ between individual channel signal A and individual channel signal B is $90° \leq \delta \leq 270°$, β'(n) is greater than β(n).

That is, when $90° \leq \delta \leq 270°$, transmitting individual channel signal B rotated by 180° makes it possible to increase reception power at the communication terminal.

As shown above, in a radio communication system using transmission diversity, the reception quality can be improved by the communication terminal controlling the amount of phase rotation by carrying out channel estimations of common pilot channel signal A and common pilot channel signal B and the base station transmitting individual channel signal B by rotating its phase as appropriate based on the amount of phase rotation control and thereby increasing the reception power of the individual channel signals at the communication terminal.

However, when the base station rotates the phase of the individual channel signals for every slot as appropriate, the reception slots at the communication terminal become discontiguous, and therefore the conventional communication terminal above fails to average channel estimation values over a plurality of slots, having a problem of decreasing the reliability of channel estimation values compared to a case where transmission diversity is not used.

DISCLOSURE OF INVENTION

It is an object of the present invention to provide a communication terminal apparatus and channel estimation method in a radio communication system using transmission diversity capable of improving the reliability of channel estimation values.

This object is attained by estimating the amount of phase rotation of common pilot channel signals with respect to individual channel signals and carrying out channel estimations using common pilot channel signals with greater transmit power than that of individual channel signals.

BEST MODE FOR CARRYING OUT THE INVENTION

With reference now to the attached drawings, embodiments of the present invention will be explained in detail below.

Figure 1:
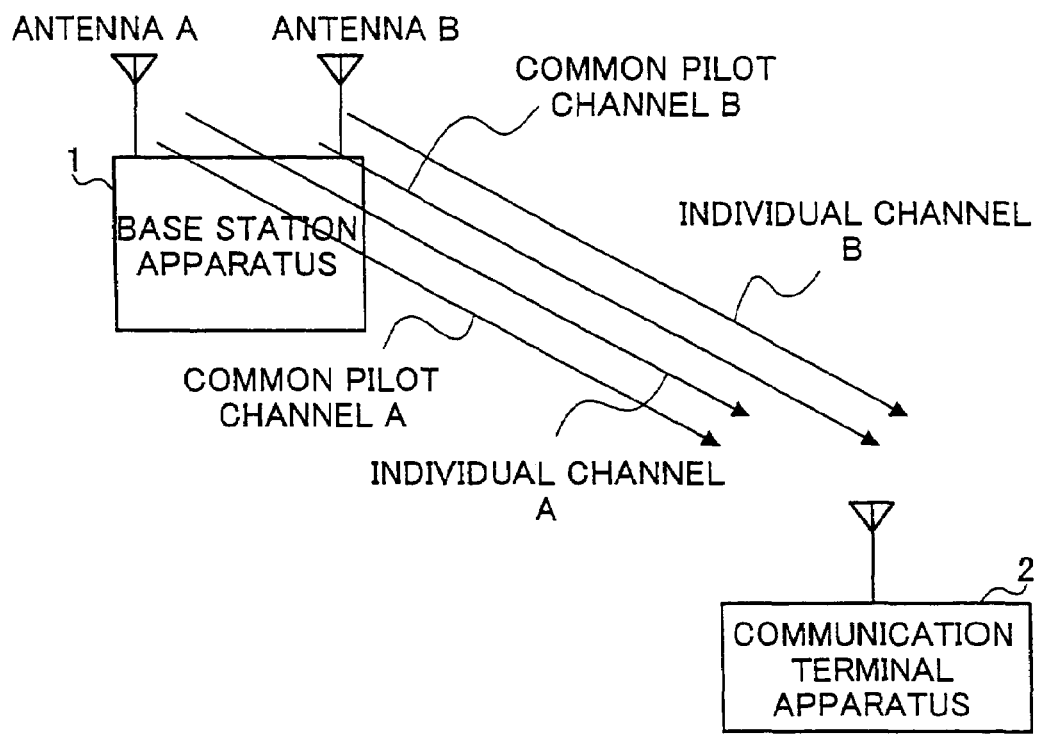
FIG. 1 is a system configuration diagram of a radio communication system using transmission diversity.
Figure 2:
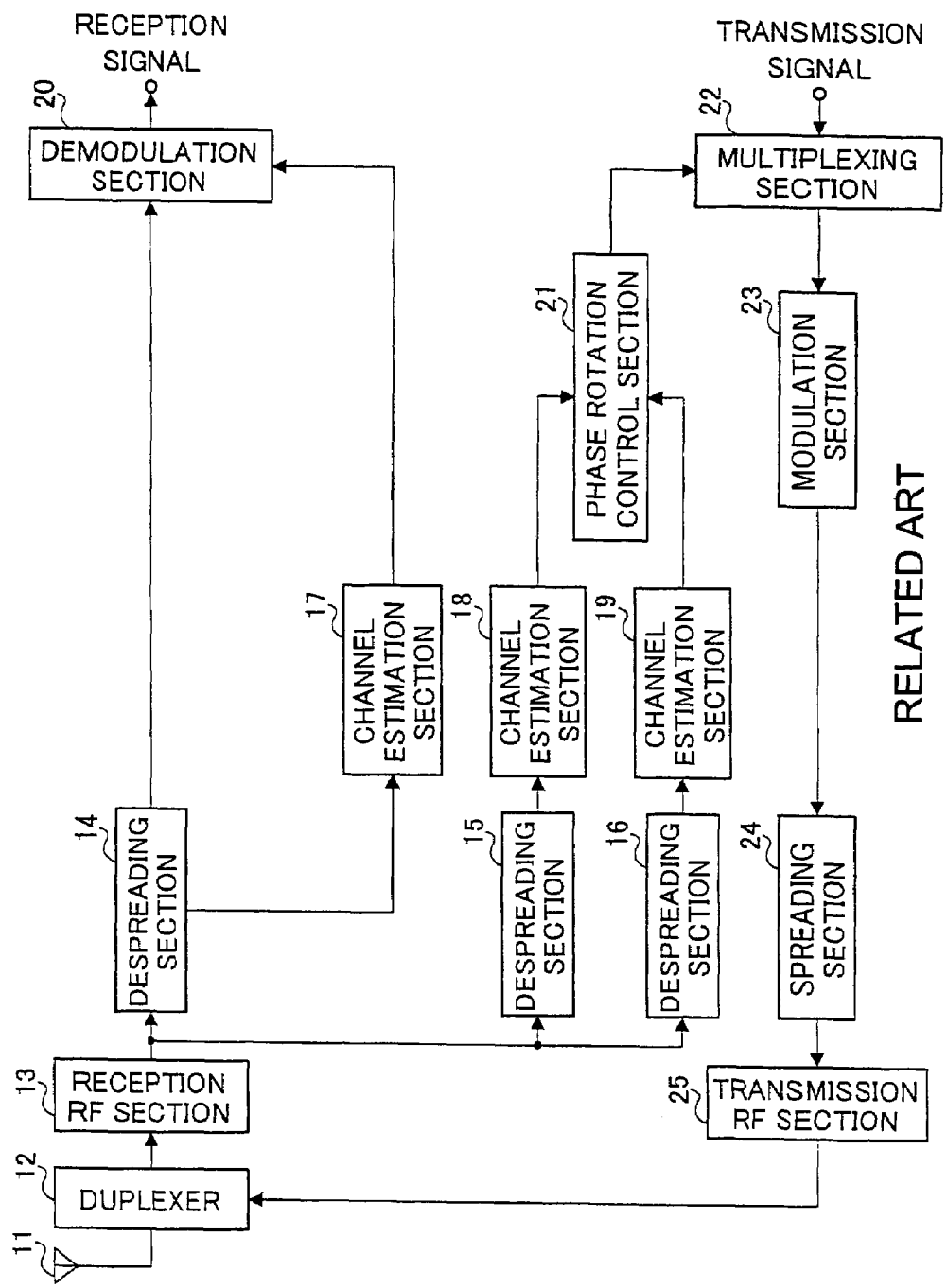
FIG. 2 is a block diagram showing a configuration of a conventional communication terminal.
Figure 3:
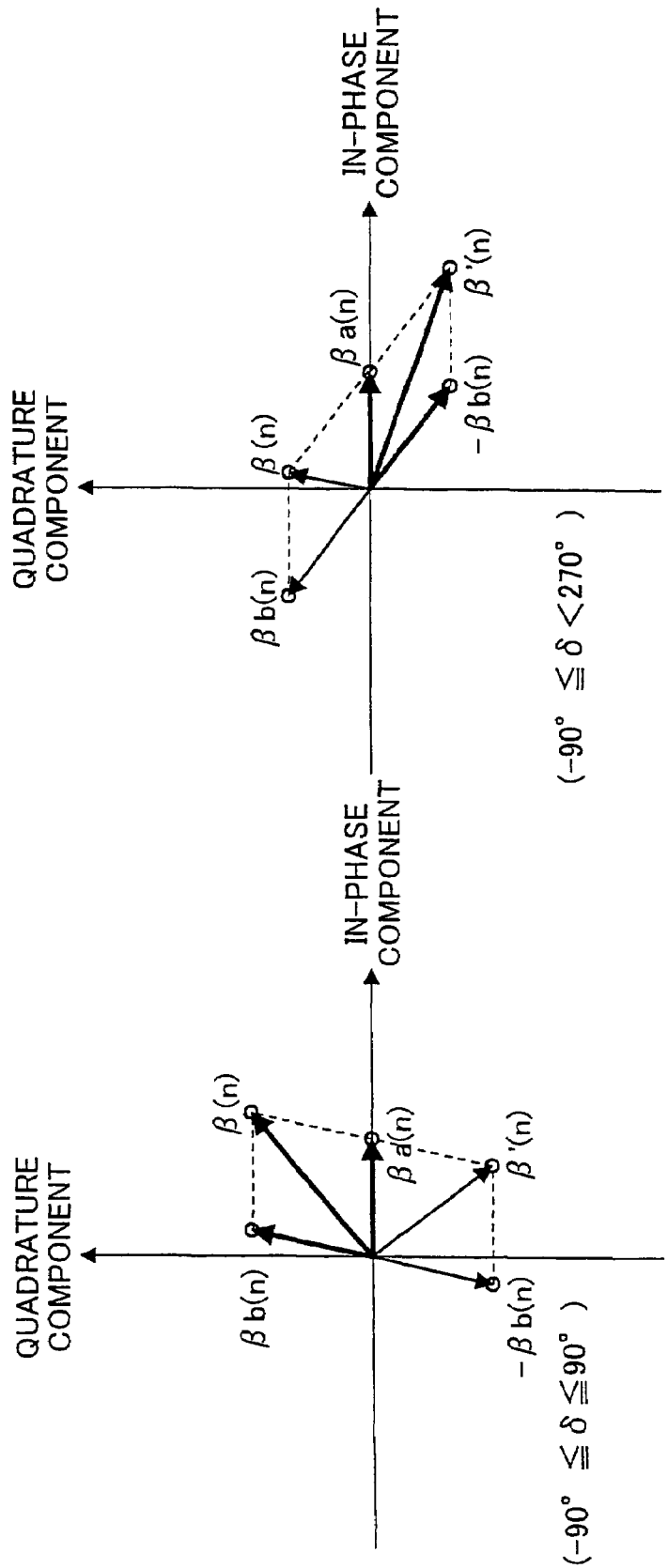
FIG. 3A illustrates a relationship between an amount of phase rotation and channel estimation values.
FIG. 3B illustrates a relationship between an amount of phase rotation and channel estimation values.
Figure 4:
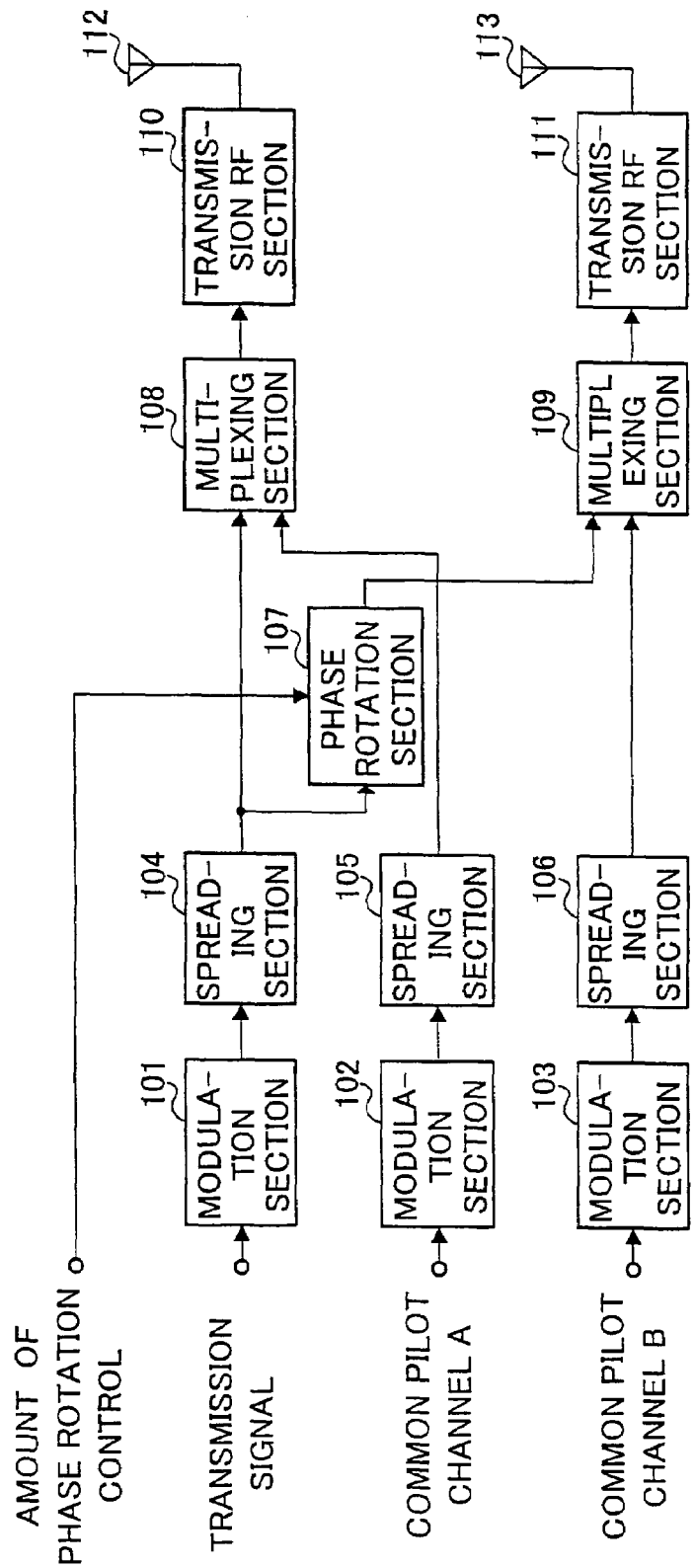
FIG. 4 is a block diagram showing a configuration of the transmitting side of a base station that carries out radio communication with a communication terminal of the present invention.

FIG. 4 is a block diagram showing a configuration of the transmitting side of a base station that carries out radio communication with a communication terminal of the present invention.

In the base station shown in FIG. 4, modulation section 101 performs primary modulation processing such as QPSK on a transmission signal. Modulation section 102 performs primary modulation processing such as QPSK on common pilot channel signal A. Modulation section 103 performs primary modulation processing such as QPSK on common pilot channel signal B.

Spreading section 104 spreads the output signal of modulation section 101 by multiplying it by a specific spreading code. Spreading section 105 spreads the output signal of modulation section 102 by multiplying it by a specific spreading code. Spreading section 106 spreads the output signal of modulation section 103 by multiplying it by a specific spreading code.

Phase rotation section 107 rotates the phase of the output signal of spreading section 104 by a predetermined amount based on a phase rotation control signal that indicates the amount of phase rotation included in the signal transmitted from the communication terminal.

Multiplexing section 108 multiplexes the output signal of spreading section 104 and the output signal of spreading section 105. Multiplexing section 109 multiplexes the output signal of phase rotation section 107 and the output signal of spreading section 106.

Transmission RF section 110 converts the frequency of the output signal of multiplexing section 108 to a radio frequency, amplifies and sends the output signal by radio from antenna 112. Transmission RF section 111 converts the frequency of the output signal of multiplexing section 109 to a radio frequency, amplifies and sends the output signal by radio from antenna 113.

By the way, the following explanations assume that the amount of phase rotation at phase rotation section 107 of the base station is two kinds, "0°" and "180°".

Embodiment 1

Embodiment 1 will describe a case where the base station transmits individual channel signal A and individual channel signal B without changing their amplitudes.

Figure 5:
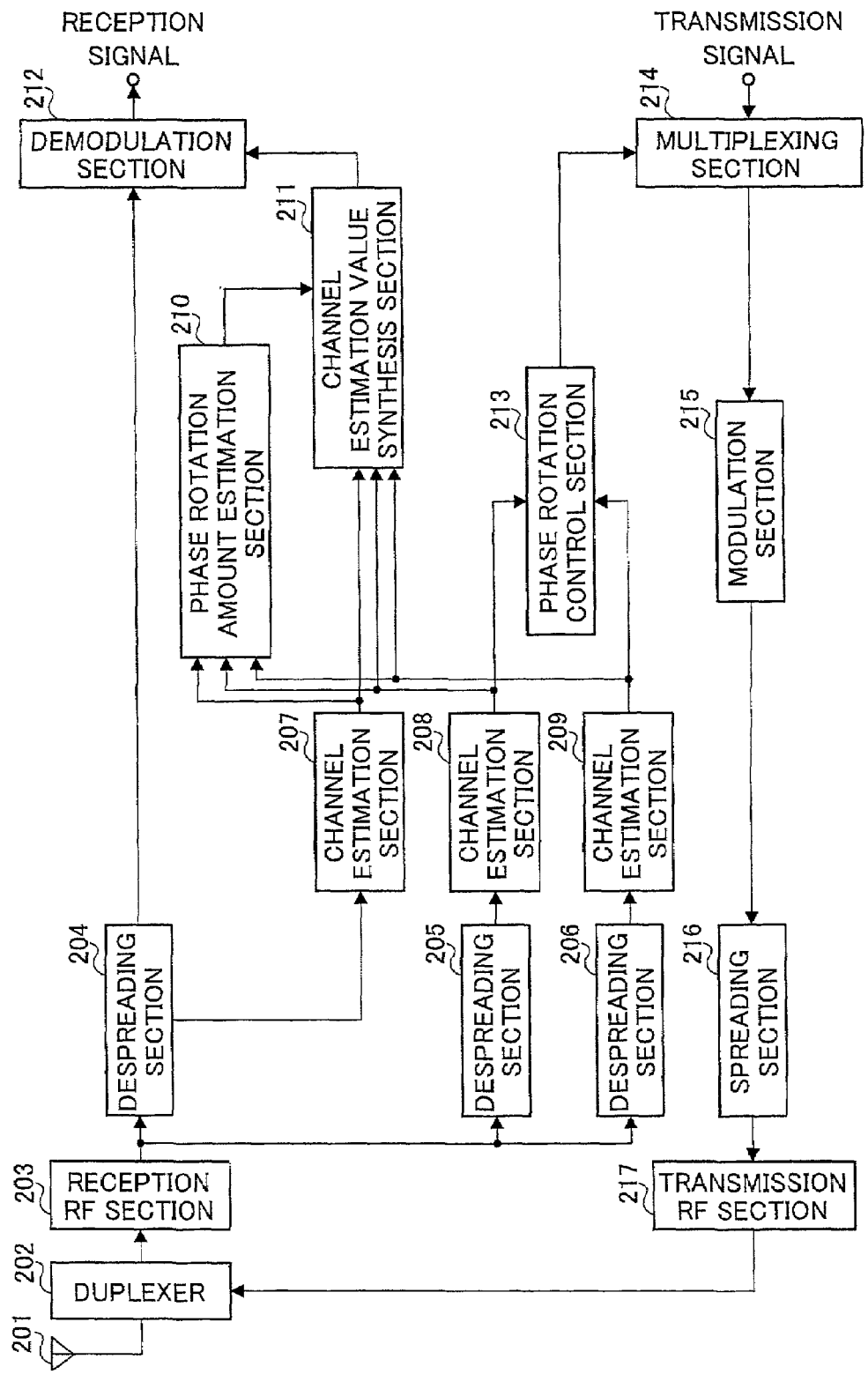
FIG. 5 is a block diagram showing a configuration of a communication terminal according to Embodiment 1 of the present invention.

FIG. 5 is a block diagram showing a configuration of a communication terminal according to Embodiment 1 of the present invention.

In the communication terminal shown in FIG. 5, antenna 201 receives a signal transmitted from the base station and sends a signal to the base station. Duplexer 202 switches between time zones of transmission and reception. Reception RF section 203 amplifies the reception signal that passes duplexer 202 and converts the frequency of the reception signal to a baseband signal.

Despreading section 204 despreads the output signal of reception RF section 203 with a spreading code of an individual channel signal and extracts a modulated signal of the individual channel signal. Likewise, despreading section 205 despreads the output signal of reception RF section 203 with a spreading code of common pilot channel signal A and extracts a modulated signal of common pilot channel signal A. Likewise, despreading section 206 despreads the output signal of reception RF section 203 with a spreading code of common pilot channel signal B and extracts a modulated signal of common pilot channel signal B.

Channel estimation section 207 estimates (so-called "channel estimation") the phase and amplitude of a propagation path using pilot symbols in the modulated signal of the individual channel signal output from despreading section 204.

Likewise, channel estimation section 208 performs a channel estimation using pilot symbols in the modulated signal of common pilot channel signal A output from despreading section 205 and channel estimation section 209 performs a channel estimation using pilot symbols in the modulated signal of common pilot channel signal B output from despreading section 206.

Phase rotation amount estimation section 210 estimates the amount of phase rotation based on the channel estimation values output from channel estimation sections 207, 208 and 209. By the way, a concrete method of estimating the amount of phase rotation in phase rotation amount estimation section 210 will be described later.

Channel estimation value synthesis section 211 synthesizes channel estimation values of common pilot channel signals based on the amount of phase rotation estimated by phase rotation amount estimation section 210 and outputs a final channel estimation value. By the way, a concrete method of synthesizing channel estimation values by channel estimation value synthesis section 211 will be described later.

Demodulation section 212 demodulates the modulated signal of the individual channel signal output from despreading section 204 based on the channel estimation value output from channel estimation value synthesis section 211 and extracts the reception signal.

Phase rotation control section 213 generates a phase rotation control signal that indicates the base station an amount of phase rotation based on a phase difference between common pilot channel signal A output from channel estimation section 208 and common pilot channel signal B output from channel estimation section 209.

In this embodiment, the amount of phase rotation in phase rotation section 107 of the base station is two kinds, "0°" and "180°", and therefore phase rotation control section 213 outputs a phase rotation control signal instructing that the amount of phase rotation be set to "0°" when phase difference δ between common pilot channel signal A and common pilot channel signal B is $-90° \leq \delta \leq 90°$ and the amount of phase rotation be set to "180°" otherwise.

Multiplexing section 214 multiplexes the transmission signal with the phase rotation control signal output from phase rotation control section 213. Modulation section 215 performs primary modulation processing such as QPSK on the output signal of multiplexing section 214. Spreading section 216 spreads the output signal of modulation section 215 by multiplying it by a specific spreading code. Transmission RF section 217 converts the frequency of the output signal of spreading section 216 to a radio frequency, amplifies and sends the signal by radio from antenna 201 via duplexer 202.

Then, a relationship of values of channel estimations carried out by channel estimation sections 207, 208 and 209 will be explained using FIG. 6A and FIG. 6B.

Figures 6A, 6B:
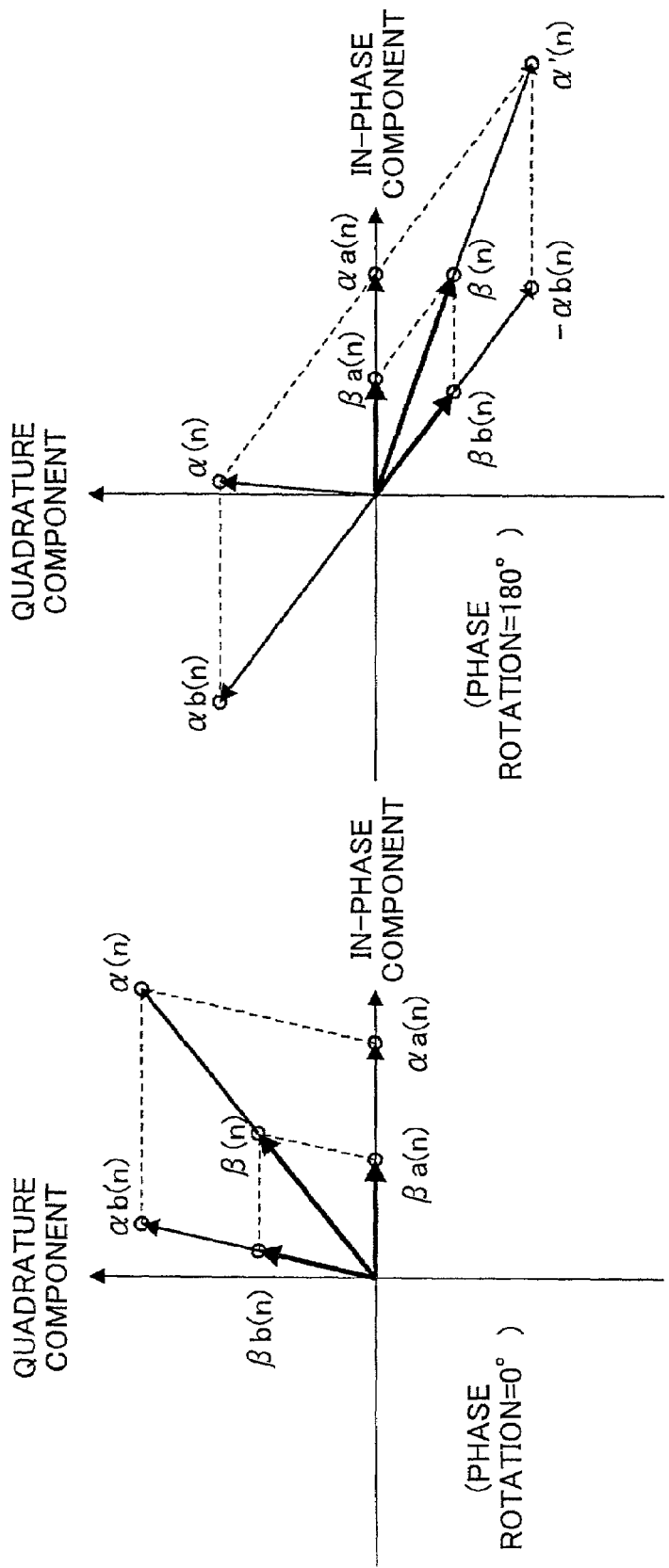
FIG. 6A illustrates a relationship of channel estimation values according to Embodiment 1 of the present invention.
FIG. 6B illustrates a relationship of channel estimation values according to Embodiment 1 of the present invention.

FIG. 6A shows a relationship of channel estimation values when the amount of phase rotation is "0°" and FIG. 6B shows a relationship of channel estimation values when the amount of phase rotation is "180°".

The following explanations assume that the channel estimation value of individual channel signal A is $\beta a(n)$ and the channel estimation value of individual channel signal B is $\beta b(n)$. In this case, channel estimation value $\beta(n)$ of the individual channel signal is expressed as a vector synthesized from $\beta a(n)$ and $\beta b(n)$.

Furthermore, suppose the channel estimation value of common pilot channel signal A is $\alpha a(n)$ and the channel estimation value of common pilot channel signal B is $\alpha b(n)$.

When the amount of phase rotation is "0°" as shown in FIG. 6A, individual channel signal A and common pilot channel signal A have the same phase and propagation path, and therefore the vector of $\beta a(n)$ and the vector of $\alpha a(n)$ point in the same direction. Likewise, the vector of $\beta b(n)$ and the vector of $\alpha b(n)$ point in the same direction.

Furthermore, when the amplitudes of individual channel signal A and individual channel signal B are not changed at the base station, the amplitude ratio of $\alpha a(n)$ to $\beta a(n)$ is equal to the amplitude ratio of $\alpha b(n)$ to $\beta b(n)$.

Therefore, channel estimation value $\beta(n)$ of the individual channel signal points in the same direction as that of synthesis result $\alpha(n)$ of $\alpha a(n)$ and $\alpha b(n)$.

That is, when the amount of phase rotation is "0°", channel estimation is possible by synthesizing the channel estimation value of common pilot channel signal A and the channel estimation value of common pilot channel signal B.

On the other hand, as shown in FIG. 6B, when the amount of phase rotation is "180°", the phase of individual channel signal B is rotated by 180° from the phase of common pilot channel signal B, and therefore the vector of $\beta b(n)$ and the vector of $\alpha b(n)$ point in different directions. Therefore, unlike the case of the amount of phase rotation of "0°", it is not possible to perform channel estimation using the result of a synthesis of channel estimation values of common pilot channel signals.

However, the vector of $-\alpha b(n)$ obtained by rotating $\alpha b(n)$ by 180° points in the same direction as that of the vector of $\beta b(n)$. Thus, $\beta(n)$ points in the same direction as that of result $\alpha'(n)$ of a synthesis of $\alpha a(n)$ and $-\alpha b(n)$.

That is, when the amount of phase rotation is "180°", channel estimation is possible by synthesizing the channel estimation value of common pilot channel signal A and a value obtained by rotating the channel estimation value of common pilot channel signal B by 180°.

Thus, when it is possible to estimate the amount of phase rotation, channel estimation is possible based on a channel estimation value of a common pilot channel signal. Moreover, since a common pilot channel signal has greater transmit power than that of an individual channel signal, the reliability of a channel estimation value is higher than a case where an individual channel signal is used.

The method for estimating the amount of phase rotation in phase rotation amount estimation section 210 will be explained below.

When two channel estimation values are parallel, one channel estimation value is orthogonal to a complex conjugate of the other channel estimation value. The amplitudes of the two channel estimation values become a minimum when the two are orthogonal to each other.

For example, as described above, when the amount of phase rotation is "0°", channel estimation value $\beta(n)$ of the individual channel signal points in the same direction as that of result $\alpha(n)$ of a synthesis of the channel estimation values of common pilot channel signals, and therefore $\beta(n)$ is orthogonal to $\alpha^*(n)$, a complex conjugate of $\alpha(n)$.

From this relation, phase rotation amount estimation section 210 calculates synthesis value $\alpha'(n)$ of channel estimation value αa(n) of common pilot channel signal A and a value obtained by rotating the phase of channel estimation value αb(n) of common pilot channel signal B by θ from expression (1) below:

$$\alpha'(n) = \alpha a(n) + \exp(j\theta) \times \alpha b(n) \quad (1)$$

Then, phase rotation amount estimation section 210 calculates amplitude X(θ) about a predetermined candidate value of each θ (in this embodiment, two kinds of θ=0° and 180°), estimates the candidate value corresponding to a minimum of X(θ) as amount of phase rotation θ and outputs the amount of phase rotation θ to channel estimation value synthesis section 211.

$$X(\theta) = \text{Re}[\alpha'^*(n)] \times \text{Re}[\beta(n)] + \text{Im}[\alpha'^*(n)] \times \text{Im}[\beta(n)] \quad (2)$$

where, (•)* denotes a complex conjugate, Re[•] denotes a real part and Im[•] denotes an imaginary part.

Since the communication terminal knows the phase rotation control signal sent to the base station, phase rotation amount estimation section 210 evaluates X(θ) using the phase rotation control signal first and when X(θ) is smaller than a threshold, it is possible to estimate this θ as the amount of phase rotation θ. This provides a high probability that the amount of phase rotation can be estimated by one calculation, and thus it is possible to shorten the time required to estimate the amount of phase rotation.

Then, the method of calculating channel estimation values by channel estimation value synthesis section 211 will be explained.

Channel estimation value synthesis section 211 enters channel estimation value β(n) of an individual channel signal from channel estimation section 207, channel estimation value αa(n) of common pilot channel signal A from channel estimation section 208 and channel estimation value αb(n) of common pilot channel signal B from channel estimation section 209 and amount of phase rotation θ from phase rotation amount estimation section 210.

Then, channel estimation value synthesis section 211 calculates final channel estimation value ξ(n) from expression (3) below and outputs to demodulation section 212.

$$\xi(n) = \alpha a(n) + \exp(j\theta) \times \alpha b(n) + \beta(n) \quad (3)$$

Thus, since a common pilot channel signal has greater transmit power than that of an individual channel signal, it is possible to improve the reliability of channel estimation values by carrying out channel estimations based on the amount of phase rotation, channel estimation values of a common pilot channel signal.

Embodiment 2

Embodiment 2 will describe a case where the base station carries out transmission by changing the amplitudes of individual channel signal A and individual channel signal B.

The relationship of channel estimation values in this embodiment will be explained using FIG. 7.

Suppose the base station sets the amplitude of individual channel signal B "a" times (hereinafter this "a" will be referred to as "amplitude coefficient") the amplitude of individual channel signal A. When the amplitude ratio of αa(n) to βa(n) is assumed to be k, the amplitude ratio of αb(n) to βb(n) is (k×a).

Figure 7:
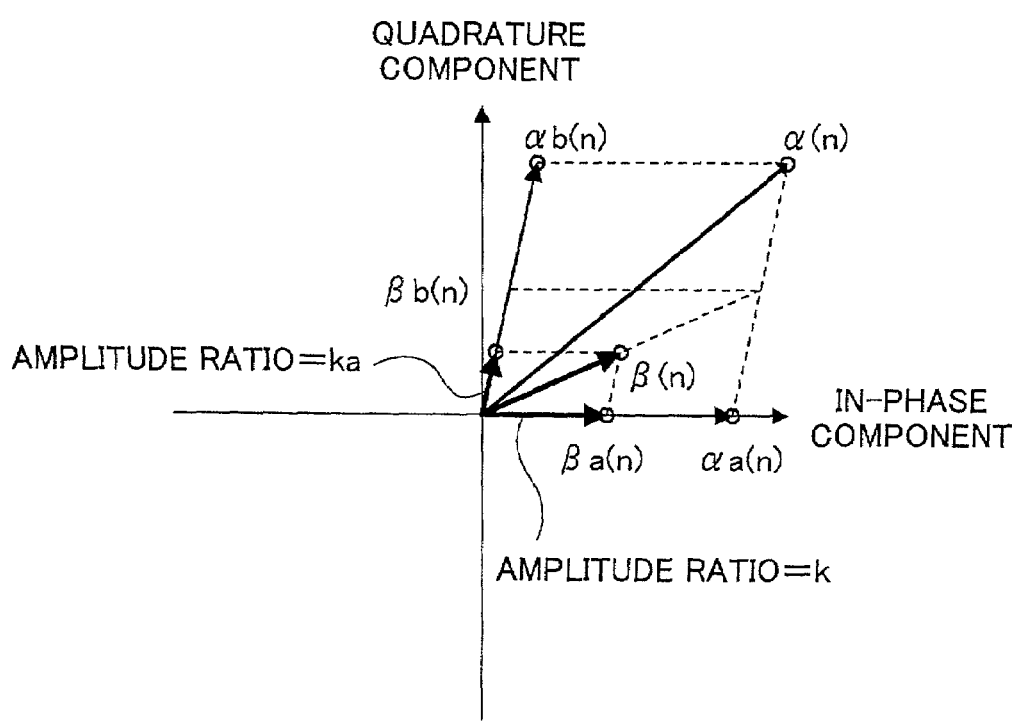
FIG. 7 illustrates a relationship of channel estimation values according to Embodiment 2 of the present invention.

In this case, as shown in FIG. 7, channel estimation value β(n) of an individual channel signal and synthesis value α(n) of common pilot channel signal A and common pilot channel signal B do not point in the same direction.

Thus, when the base station carries out transmission by changing the amplitudes of individual channel signal A and individual channel signal B, α(n) cannot be used as is for channel estimations, but it is necessary to take into account amplitude coefficient "a".

Figure 8:
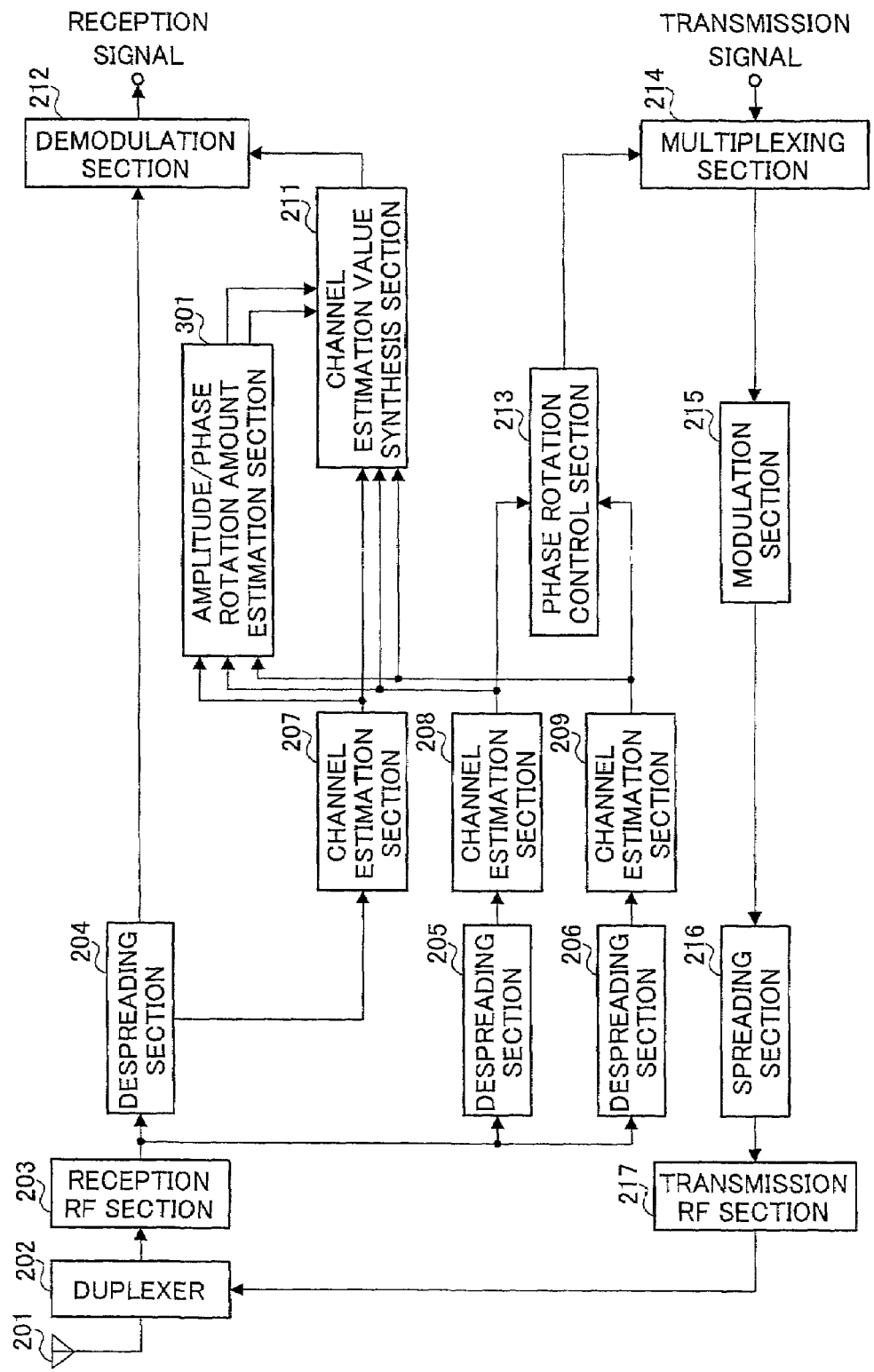
FIG. 8 is a block diagram showing a configuration of a communication terminal according to Embodiment 2 of the present invention.

FIG. 8 is a block diagram showing a configuration of a communication terminal according to Embodiment 2 of the present invention. In the communication terminal shown in FIG. 8, the same components as those in the communication terminal in FIG. 5 will be assigned the same reference numerals as those in FIG. 5 and explanations thereof will be omitted.

The communication terminal shown in FIG. 8 has a configuration of the communication terminal shown in FIG. 5 with amplitude/phase rotation amount estimation section 301 added instead of phase rotation amount estimation section 210.

Amplitude/phase rotation amount estimation section 301 first calculates a synthesis value α'(n) of channel estimation value αa(n) of common pilot channel signal A and a value obtained by rotating the phase of channel estimation value αb(n) of common pilot channel signal B by θ from expression (4) below:

$$\alpha'(n) = \alpha a(n) + a \times \exp(j\theta) \times \alpha b(n) \quad (4)$$

Then, amplitude/phase rotation amount estimation section 301 calculates amplitude X(a, θ) about predetermined candidate values of each θ (in this embodiment, two types of θ=0, 180) and predetermined candidate values of each amplitude coefficient "a" (e.g., a=0.5, 1.0, 2.0, etc.) from expression (5) below, estimates the combination of candidate values corresponding to a minimum of X(θ) as amplitude coefficient "a" and the amount of phase rotation θ and outputs amplitude coefficient "a" and the amount of phase rotation θ to channel estimation value synthesis section 211.

$$X(a, \theta) = \text{Re}[\alpha'^*(n)] \times \text{Re}[\beta(n)] + \text{Im}[\alpha'^*(n)] \times \text{Im}[\beta(n)] \quad (5)$$

Channel estimation value synthesis section 211 enters channel estimation value β(n) of an individual channel signal from channel estimation section 207, channel estimation value αa(n) of common pilot channel signal A from channel estimation section 208 and channel estimation value αb(n) of common pilot channel signal B from channel estimation section 209 and amplitude coefficient "a" and amount of phase rotation θ from amplitude/phase rotation amount estimation section 301.

Then, channel estimation value synthesis section 211 calculates final channel estimation value ξ(n) from expression (6) below and outputs to demodulation section 212.

$$\xi(n) = \alpha a(n) + a \times \exp(j\theta) \times \alpha b(n) + \beta(n) \quad (6)$$

Thus, it is possible to improve the reliability of channel estimation values by carrying out channel estimations based on the amplitude coefficient, the amount of phase rotation, channel estimation values of common pilot channel signals even when the base station carries out transmission by changing the amplitudes of individual channel signals.

Embodiment 3

When a maximum Doppler frequency of fading is low and a fading variation is moderate, it is possible to improve the reliability of channel estimation values by averaging fading estimation values over a plurality of reception slots.

However, as described above, when transmission diversity is introduced to a radio communication system, reception slots become discontiguous, and therefore it is not possible to average channel estimation values over a plurality of slots.

Embodiment 3 is intended to solve this problem and describes a case where transmission diversity is introduced and channel estimation values are synthesized over a plurality of slots.

Figure 9:
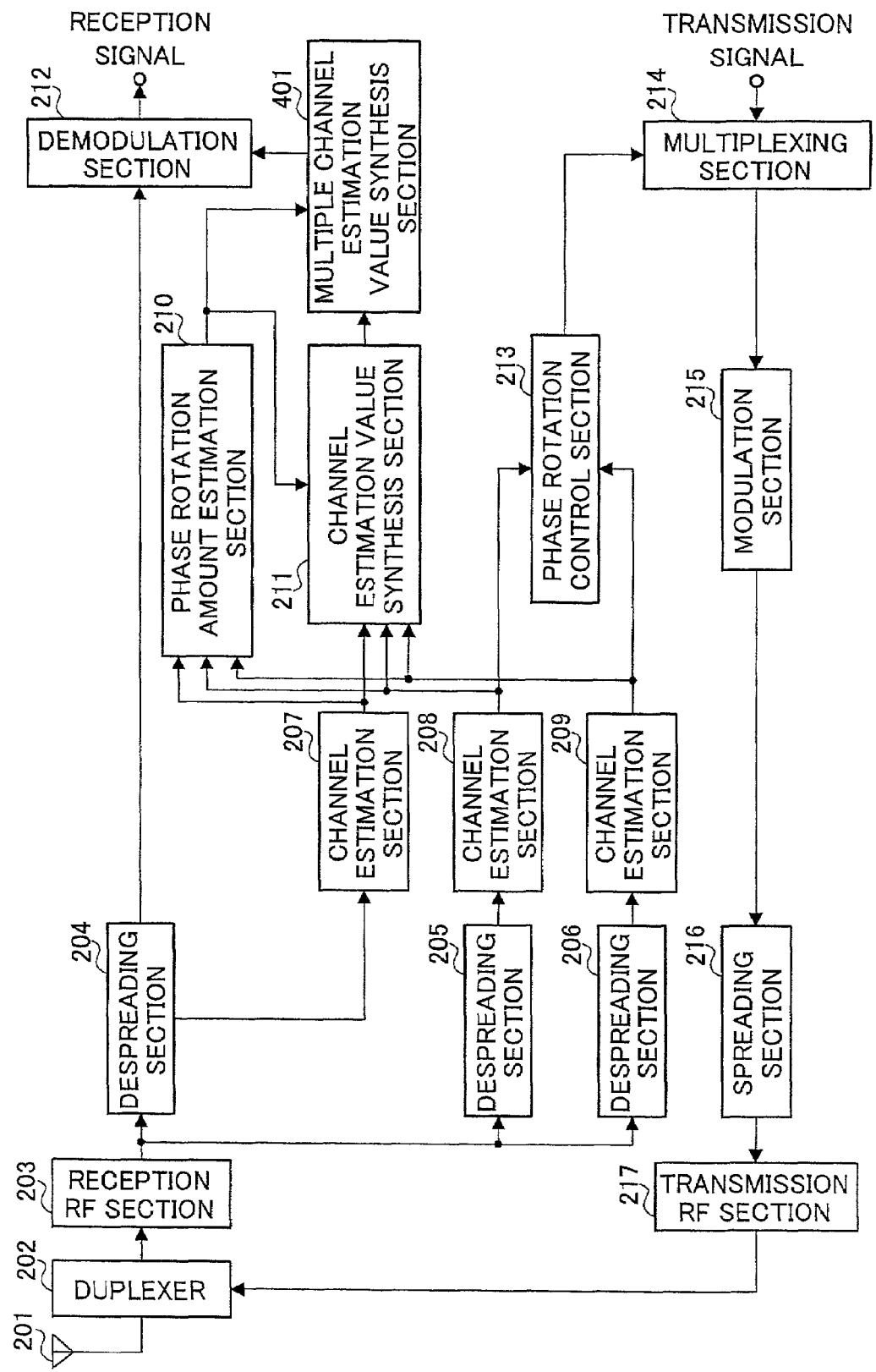
FIG. 9 is a block diagram showing a configuration of a communication terminal according to Embodiment 3 of the present invention.

FIG. 9 is a block diagram showing a configuration of a communication terminal according to Embodiment 3 of the present invention. In the communication terminal shown in FIG. 9, the same components as those in the communication terminal in FIG. 5 will be assigned the same reference numerals as those in FIG. 5 and explanations thereof will be omitted.

The communication terminal shown in FIG. 9 has a configuration of the communication terminal shown in FIG. 5 with multiple channel estimation value synthesis section 401 added.

Figure 10:
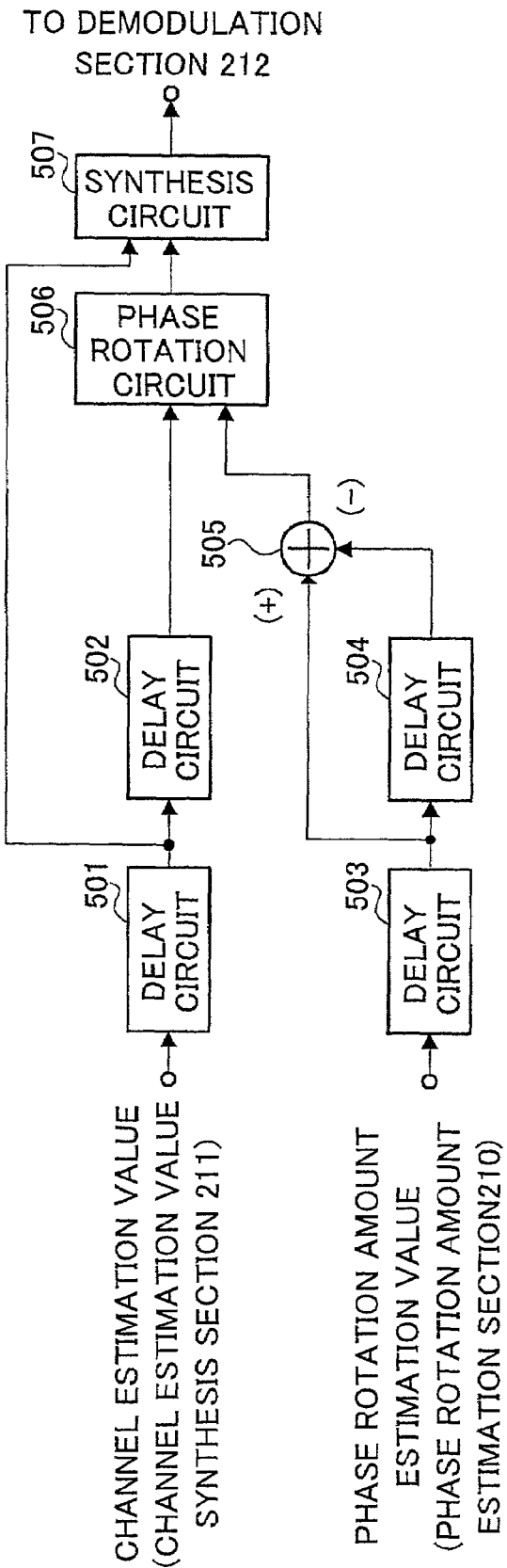
FIG. 10 is a block diagram showing an internal configuration of a multiple channel estimation value synthesis section of the communication terminal according to Embodiment 3 of the present invention.

FIG. 10 is a block diagram showing an internal configuration of multiple channel estimation value synthesis section 401.

In FIG. 10, delay circuit 501 stores a channel estimation value at current time (n) and delay circuit 502 stores a channel estimation value at time (n-1), 1 slot ahead.

Delay circuit 503 stores the amount of phase rotation at current time (n) and delay circuit 504 stores the amount of phase rotation at time (n-1), 1 slot ahead. Then, addition circuit 505 calculates a difference between the amount of phase rotation at time (n) and the amount of phase rotation at time (n-1).

Phase rotation circuit 506 corrects the amount of phase rotation from time (n-1) to time (n) with respect to the channel estimation value at time (n-1) output from delay circuit 502 based on the calculation result of addition circuit 505.

Then, synthesis circuit 507 synthesizes the corrected channel estimation value at time (n-1) output from phase rotation circuit 506 and the channel estimation value at time (n) output from delay circuit 502.

Thus, by correcting a channel estimation value at a time 1 slot ahead and synthesizing this correction result and the channel estimation value at the current time, it is possible to synthesize channel estimation values over a plurality of slots and thereby improve the reliability of channel estimation values.

This embodiment describes the case where the channel estimation value at a time 1 slot ahead is corrected and synthesized with a channel estimation value at the current time, but the present invention is not limited to a time 1 slot ahead, and it is possible to apply the same correction processing to a channel estimation value at a time any number of preceding reception slots ahead and synthesize it with the channel estimation value at the current time.

Embodiment 3 can be combined with Embodiment 2 and it is possible to synthesize channel estimation values over a plurality of slots even when the base station carries out transmission by changing the amplitudes of individual channel signals.

As described above, the communication terminal apparatus and channel estimation method of the present invention can improve the reliability of channel estimation values in a radio communication system using transmission diversity by using channel estimation values of common pilot channel signals, etc.

This application is based on the Japanese Patent Application No.HEI 11-241621 filed on Aug. 27, 1999, entire content of which is expressly incorporated by reference herein.

INDUSTRIAL APPLICABILITY

The present invention is ideally applicable to a CDMA-based radio communication system.

What is claimed is:

1. A communication terminal apparatus that performs radio communication with a base station apparatus that transmits from a first antenna and a second antenna common pilot channel signals that are separable, the common pilot channel signal transmitted from the first antenna being accompanied by a dedicated channel signal having a same phase as said common pilot channel signal, the common pilot channel signal transmitted from the second antenna being accompanied by a dedicated channel having a phase rotated from said common pilot channel signal by a candidate phase rotation amount selected from a plurality of candidate phase rotation amounts, the communication terminal apparatus comprising:
   a first channel estimator that performs channel estimation with respect to the common pilot channel signal from the first antenna and outputs a first estimation value;
   a second channel estimator that performs channel estimation with respect to the common pilot channel signal from the second antenna and outputs a second estimation value;
   a third channel estimator that performs channel estimation with respect to the dedicated channel signals from the first and second antennas and outputs a third estimation value;
   a phase rotation amount estimator that estimates the phase rotation amount selected in the base station apparatus;
   a channel estimation value synthesizer that synthesizes the first estimation value, a value obtained from the second estimation value by applying the phase rotation amount estimated in the phase rotation amount estimator to said second estimation value, and the third estimation value so as to calculate a definite channel estimation value; and
   a demodulator that demodulates the dedicated channel signals using the channel estimation value calculated in the channel estimation value synthesizer.

2. The communication terminal apparatus of claim 1, wherein:
   on a per candidate phase rotation amount basis, the phase rotation amount estimator calculates a synthesis value of the first estimation value and a value obtained from the second estimation value by applying a candidate phase rotation amount to said second estimation value, multiplies a real part and an imaginary part of the synthesis value and a real part and an imaginary part of the third estimation value, respectively, and adds the multiplication result of the real parts and the multiplication result of the imaginary parts so as to calculate an amplitude; and
   the phase rotation amount estimator estimates at least one of the plurality of candidate phase rotation amounts, with respect to which a smallest amplitude is calculated, to be the phase rotation amount selected in the base station apparatus.

3. A communication terminal apparatus that performs radio communication with a base station apparatus that transmits from a first antenna and a second antenna common pilot channel signals that are separable, the common pilot channel signal transmitted from the first antenna being accompanied by a dedicated channel signal having a same phase as said common pilot channel signal, the common pilot channel signal transmitted from the second antenna being accompanied by a dedicated channel having an amplitude multiplied by a amplitude coefficient selected from a plurality of candidate amplitude coefficients and having a phase rotated from said common pilot channel signal by a phase rotation amount selected from a plurality of candidate phase rotation amounts, the communication terminal apparatus comprising:
- a first channel estimator that performs channel estimation with respect to the common pilot channel signal from the first antenna and outputs a first estimation value;
- a second channel estimator that performs channel estimation with respect to the common pilot channel signal from the second antenna and outputs a second estimation value;
- a third channel estimator that performs channel estimation with respect to the dedicated channel signals from the first and second antennas and outputs a third estimation value;
- an amplitude and phase rotation amount estimator that estimates the amplitude coefficient and the phase rotation amount selected in the base station apparatus;
- a channel estimation value synthesizer that synthesizes the first estimation value, a value obtained from the second estimation value by applying the amplitude coefficient and the phase rotation amount estimated in the amplitude and phase rotation amount estimator to said second estimation value, and the third estimation value so as to calculate a definite channel estimation value; and
- a demodulator that demodulates the dedicated channel signals using the channel estimation value calculated in the channel estimation value synthesizer.

4. The communication terminal apparatus of claim 1, wherein:
- on a per candidate phase rotation amount basis, the phase rotation amount estimator calculates a synthesis value of the first estimation value and a value obtained from the second estimation value by applying a candidate amplitude coefficient and a candidate phase rotation amount to said second estimation value, multiplies a real part and an imaginary part of the synthesis value and a real part and an imaginary part of the third estimation value, respectively, and adds the multiplication result of the real parts and the multiplication result of the imaginary parts so as to calculate an amplitude; and
- the phase rotation amount estimator estimates at least one of the plurality of candidate amplitude coefficients and at least one of the plurality of candidate phase rotation amounts, with respect to which a smallest amplitude is calculated, to be the amplitude coefficient and the phase rotation amount selected in the base station apparatus.

5. The communication terminal apparatus or claim 1, further comprising a multiple channel estimation value synthesizer than corrects a plurality of channel estimation values calculated in the channel estimation value synthesizer, such that the phase rotation amount synchronizes between said plurality of channel estimation values, and synthesizes the corrected channel estimation values.

6. A channel estimation method in a communication terminal apparatus that performs radio communication with a base station apparatus that transmits from a first antenna and a second antenna common pilot channel signals that are separable, the common pilot channel signal transmitted from the first antenna being accompanied by a dedicated channel signal having a same phase as said common pilot channel signal, the common pilot channel signal transmitted from the second antenna being accompanied by a dedicated channel having a phase rotated from said common pilot channel signal by a candidate phase rotation amount selected from a plurality of candidate phase rotation amounts, the communication terminal apparatus comprising:
- a first channel estimation step of performing channel estimation with respect to the common pilot channel signal from the first antenna and outputting a first estimation value;
- a second channel estimation step of performing channel estimation with respect to the common pilot channel signal from the second antenna and outputting a second estimation value;
- a third channel estimation step of performing channel estimation with respect to the dedicated channel signals from the first and second antennas and outputting a third estimation value;
- a phase rotation amount estimation step of estimating the phase rotation amount selected in the base station apparatus; and
- a channel estimation value synthesis step of synthesizing the first estimation value, a value obtained from the second estimation value by applying the phase rotation amount estimated in the phase rotation amount estimation step to said second estimation value, and the third estimation value so as to calculate a definite channel estimation value.

7. A channel estimation method in a communication terminal apparatus that performs radio communication with a base station apparatus that transmits from a first antenna and a second antenna common pilot channel signals that are separable, the common pilot channel signal transmitted from the first antenna being accompanied by a dedicated channel signal having a same phase as said common pilot channel signal, the common pilot channel signal transmitted from the second antenna being accompanied by a dedicated channel having an amplitude multiplied by an amplitude coefficient selected from a plurality of candidate amplitude coefficients and having a phase rotated from said common pilot channel signal by a phase rotation amount selected from a plurality of candidate phase rotation amounts, the communication terminal apparatus comprising:
- a first channel estimation step of performing channel estimation with respect to the common pilot channel signal from the first antenna and outputting a first estimation value;
- a second channel estimation step of performing channel estimation with respect to the common pilot channel signal from the second antenna and outputting a second estimation value;
- a third channel estimation step of performing channel estimation with respect to the dedicated channel signals from the first and second antennas and outputting a third estimation value;
- an amplitude and phase rotation amount estimation step of estimating the amplitude coefficient and the phase rotation amount selected in the base station apparatus; and
- a channel estimation value synthesis step of synthesizing the first estimation value, a value obtained from the second estimation value by applying the amplitude coefficient and the phase rotation amount estimated in the amplitude and phase rotation amount estimator to said second estimation value, and the third estimation value so as to calculate a definite channel estimation value.

8. The channel estimation method of claim 6, further comprising a multiple channel estimation value synthesis step of correcting a plurality of channel estimation values calculated in the channel estimation value synthesis step, such that the phase rotation amount synchronizes between said plurality of channel estimation values, and synthesizing the corrected channel estimation values.

* * * * *

UNITED STATES PATENT AND TRADEMARK OFFICE
CERTIFICATE OF CORRECTION

PATENT NO. : 7,002,939 B1  Page 1 of 1
APPLICATION NO. : 09/807287
DATED : February 21, 2006
INVENTOR(S) : Katsuhiko Hiramatsu It is certified that error appears in the above-identified patent and that said Letters Patent is hereby corrected as shown below:

On the title page item (54) and Col.1, line 1, should read as follows:
--COMMUNICATION TERMINAL APPARATUS AND CHANNEL ESTIMATION METHOD,-- not "COMMUNICATION TERMINAL DEVICE AND CHANNEL ESTIMATION METHOD."

On the title page insert item --(30) Foreign Application Priority Data, Aug. 27, 1999 JP ..........11-241621.--

Signed and Sealed this

Nineteenth Day of September, 2006

JON W. DUDAS
*Director of the United States Patent and Trademark Office*